(12) United States Patent
Johansson et al.

(10) Patent No.: US 9,036,655 B2
(45) Date of Patent: *May 19, 2015

(54) KEY FRAME DETECTION AND SYNCHRONIZATION

(71) Applicant: MOBITV, INC., Emeryville, CA (US)

(72) Inventors: Kay Johansson, Oakland, CA (US); Kent Karlsson, Sodertalie (SE)

(73) Assignee: MobiTV, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/973,178

(22) Filed: Aug. 22, 2013

(65) Prior Publication Data

US 2013/0339542 A1    Dec. 19, 2013

Related U.S. Application Data

(63) Continuation of application No. 11/626,340, filed on Jan. 23, 2007, now Pat. No. 8,542,705.

(51) Int. Cl.
| | |
|---|---|
| *H04J 3/24* | (2006.01) |
| *H04L 29/06* | (2006.01) |
| *H04N 7/173* | (2011.01) |
| *H04N 21/234* | (2011.01) |
| *H04N 21/236* | (2011.01) |
| *H04N 21/266* | (2011.01) |
| *H04N 21/433* | (2011.01) |
| *H04N 21/438* | (2011.01) |

(Continued)

(52) U.S. Cl.
CPC .......... *H04L 65/607* (2013.01); *H04N 7/17318* (2013.01); *H04N 21/23424* (2013.01); *H04N 21/236* (2013.01); *H04N 21/26616* (2013.01); *H04N 21/4331* (2013.01); *H04N 21/4384* (2013.01); *H04N 21/44016* (2013.01); *H04N 21/472* (2013.01); *H04N 21/6581* (2013.01); *H04N 21/8455* (2013.01)

(58) Field of Classification Search
CPC .. H04I 65/4076; H04I 65/4084; H04I 65/601; H04I 65/607; H04I 65/608; H04I 69/04; H04N 21/23424; H04N 21/236; H04N 21/26616; H04N 21/4331; H04N 21/44016; H04N 21/472; H04N 21/6581; H04N 21/8455; H04N 21/4384
USPC .................... 370/503, 509–513, 395.64, 473
See application file for complete search history.

(56) References Cited

U.S. PATENT DOCUMENTS

| | | | | |
|---|---|---|---|---|
| 6,023,553 | A * | 2/2000 | Boyce et al. .................. | 386/329 |
| 6,496,980 | B1 * | 12/2002 | Tillman et al. ................. | 725/90 |

(Continued)

OTHER PUBLICATIONS

"U.S. Appl. No. 11/626,340, Non Final Office Action mailed Dec. 26, 2012".

(Continued)

*Primary Examiner* — Peter Cheng
(74) *Attorney, Agent, or Firm* — Kwan & Olynick LLP

(57) ABSTRACT

Mechanisms are provided for allowing a streaming server to efficiently provide frames associated with a media stream to a client device. A streaming server receives multiple media streams and determines which frames in the multiple media streams are key frames. When a connection request is received from a client device, a key frame is selected and provided to the client device. A client device receiving a key frame does not have to drop any predictive frames prior to playing a media stream.

20 Claims, 6 Drawing Sheets

(51) Int. Cl.
*H04N 21/44* (2011.01)
*H04N 21/472* (2011.01)
*H04N 21/658* (2011.01)
*H04N 21/845* (2011.01)

(56) References Cited

U.S. PATENT DOCUMENTS

| | | |
|---|---|---|
| 7,764,863 B1 | 7/2010 | Strasman |
| 8,542,705 B2 | 9/2013 | Johansson et al. |
| 2005/0081244 A1* | 4/2005 | Barrett et al. ............ 725/97 |
| 2005/0190781 A1 | 9/2005 | Green et al. |
| 2006/0136581 A1 | 6/2006 | Smith |
| 2007/0044128 A1 | 2/2007 | Witt |
| 2007/0116437 A1 | 5/2007 | Pun et al. |
| 2007/0242666 A1 | 10/2007 | Barrett |
| 2007/0277219 A1 | 11/2007 | Toebes et al. |
| 2008/0137728 A1* | 6/2008 | Van Der Stok et al. .. 375/240.01 |

OTHER PUBLICATIONS

"U.S. Appl. No. 11/626,340, Advisory Action mailed Oct. 18, 2012".

"U.S. Appl. No. 11/626,340, Notice of Allowance mailed May 22, 2013".

"U.S. Appl. No. 11/626,340, Response filed Oct. 9, 2012 to Final Office Action Aug. 14, 2012".

"European Application Serial No. 08713763.4, Office Action mailed Oct. 31, 2012".

* cited by examiner

KEY FRAME DETECTION AND SYNCHRONIZATION

CROSS-REFERENCE TO RELATED APPLICATIONS

The present invention claims priority of pending U.S. patent application Ser. No. 11/626,340 filed Jan. 23, 2007, which is incorporated herein by reference in its entirety.

DESCRIPTION OF RELATED ART

The present disclosure relates to media streams. In one example, the present invention relates to methods and apparatus for efficiently providing a media stream to a client device.

Various devices have the capability of playing media streams received from a streaming server. One example of a media stream is an Moving Picture Experts Group (MPEG) video stream. Media streams such as MPEG video streams often encode media data as a sequence of frames and provide the sequence of frames to a client device. Some frames are key frames that provide substantially all of the data needed to display an image. An MPEG I-frame is one example of a key frame. Other frames are predictive frames that provide information about differences between the predictive frame and a reference key frame.

Predictive frames such as MPEG B-frames and MPEG P-frames are smaller and more bandwidth efficient than key frames. However, predictive frames rely on key frames for information and can not be accurately displayed without information from key frames. A streaming server often has a number of media streams that it receives and maintains in its buffers. In some examples, a streaming server maintains one buffer per channel. When a client device connects to a streaming server, the streaming server provides a selected media stream to the client device. The client device can then play the media stream using a decoding mechanism.

However, mechanisms for efficiently providing media streams to client devices are limited. In many instances, media streams are provided in a manner that introduces notable delay. Consequently, the techniques of the present invention provide mechanisms for improving the ability of a streaming server to efficiently provide media streams to client devices.

OVERVIEW OF THE INVENTION

Mechanisms are provided for allowing a streaming server to efficiently provide frames associated with a media stream to a client device. A streaming server receives multiple media streams and identifies key frames in the media streams. When a connection request is received from a client device, a key frame is selected and provided to the client device. A client device receiving a key frame does not have to drop or inaccurately display any predictive frames prior to playing the media stream.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate particular embodiments of the present invention.

DESCRIPTION OF PARTICULAR EMBODIMENTS

Figure 1:
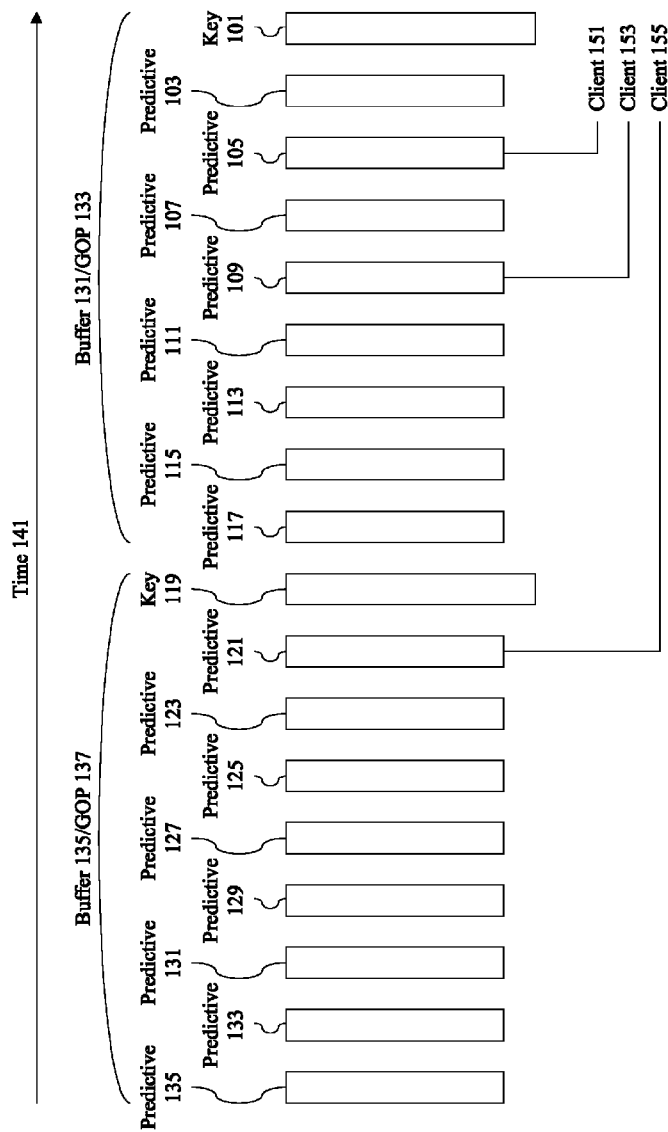
FIG. 1 is a diagrammatic representation showing a sequence of video stream frames.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular networks and particular devices. However, it should be noted that the techniques of the present invention can be applied to a variety of different networks and a variety of different devices. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted. Furthermore, the techniques and mechanisms of the present invention will sometimes describe two entities as being connected. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Streaming servers receive media streams such as audio and video streams from associated encoders and content providers and send the media streams to individual devices. In order to conserve network resources, media streams are typically encoded in order to allow efficient transmission.

One mechanism for encoding media streams such as video streams involves the use of key frames and predictive frames. A key frame holds substantially all of the data needed to display a video frame. A predictive frame, however, holds only change information or delta information between itself and a reference key frame. Consequently, predictive frames are typically much smaller than key frames. In general, any frame that can be displayed substantially on its own is referred to herein as a key frame. Any frame that relies on information from a reference key frame is referred to herein as a predictive frame. In many instances, many predictive frames are transmitted for every key frame transmitted. Moving Picture Experts Group (MPEG) provides some examples of encoding systems using key frames and predictive frames. MPEG and its various incarnations use I-frames as key frames and B-frames and P-frames as predictive frames.

A streaming server includes a buffer to hold media streams received from upstream sources. In some examples, a streaming server includes a first in first out (FIFO) buffer per channel of video received. When a client device requests a particular media stream from the streaming server, the streaming server begins to provide the media stream, typically by providing the oldest frame still in the buffer. A client device may request a media stream when a user is a changing a channel, launching an application, or performing some other action that initiates a request for a particular media stream or channel. Due to the relative infrequency of key frames in a video stream, the client device will most likely begin receiving predictive frames. Predictive frames rely on information from a reference key frame in order to provide a clear picture. The client device can then either begin displaying a distorted picture using predictive frame information or can simply drop the predictive frames. In either case, the user experience is poor, because the client device can not display an undistorted picture until a key frame is received. Depending on the encoding scheme, a substantial number of predictive frames may be received before any key frame is received.

Consequently, when a user initially requests a particular program or changes a channel, there is notable delay before the user can see an accurate picture. A variety of limitations contribute to the delay. The techniques of the present invention recognize that the transmission of unusable predictive frames upon a connection request is one factor that contributes to the delay.

Some available solutions rely on increasing the transmission rate to a client device when a client device connection request is received. In this manner, predictive frames and key frames are transmitted more rapidly to a client device when a client requests a media stream and a key frame is more likely to arrive sooner. However, there is still delay in transmitting a key frame. Furthermore, not all networks support this type of transmission burst and even ones that do may not want to encourage this type of possibly disruptive activity. For example, many users may request to receive a channel at the beginning of a live event. Having a large amount of burst activity may be disruptive to network operation.

In many conventional implementations, streaming servers are designed to provide large amounts of data from a variety of sources to a variety of client devices in as efficient a manner as possible. Consequently, streaming servers often perform little processing on media streams, as processing can significantly slow down operation. However, the techniques and mechanisms recognize that is it beneficial to provide more intelligence in a streaming server by adding some additional processing. By using a smart, key frame sensitive buffer in the streaming server, an initial key frame can be provided to the user when a client device requests a connection. Bandwidth is better utilized, wait time is decreased, and user experience is improved.

According to various embodiments, a streaming server identifies key frames in media streams maintained in one or more buffers. When a connection request is received from a client device, a key frame is provided to the client device even if the key frame is not the first available frame. That is, a key frame is provided even if one or more predictive frames are available before the key frame. This allows a client device to receive a frame that it can display without distortion. Subsequent predictive frames can then reference the key frame. Connection requests such as channel changes or initial channel requests are handled efficiently. Although there may still be delay in transmission and delay in buffering and decoding at a client device, delay because of the receipt of unusable predictive frames is decreased as a streaming server will initially provide a usable key frame to a client device.

FIG. 1 is a diagrammatic representation showing one example of a sequence of frames. According to various embodiments, a sequence of frames such as a sequence of video frames is received at a streaming server. In some embodiments, the sequence of video frames is associated with a particular channel and a buffer is assigned to each channel. Other sequences of video frames may be held in other buffers assigned to other channels. In other examples, buffers or portions of buffers are maintained for separate video streams and separate channels. In particular embodiments, key frame 101 is received early along time axis 141. One example of a key frame 101 is an I frame that includes substantially all of the data needed for a client device to display a frame of video. Key frame 101 is followed by predictive frames 103, 105, 107, 109, 111, 113, 115, and 117.

According to various embodiments, a sequence of different frames types, beginning with a key frame and ending just before a subsequence key frame, is referred to herein as a Group of Pictures (GOP). Key frame 101 and predictive frames 103, 105, 107, 109, 111, 113, 115, and 117 are associated with GOP 133 and maintained in buffer 131 or buffer portion 131. An encoding application typically determines the length and frame types included in a GOP. According to various embodiments, an encoder provides the sequence of frames to the streaming server. In some examples, a GOP is 15 frames long and includes an initial key frame such as an I frame followed by predictive frames such as B and P frames. A GOP may have a variety of lengths. An efficient length for a GOP is typically determined based upon characteristics of the video stream and bandwidth constrains. For example, a low motion scene can benefit from a longer GOP with more predictive frames. Low motion scenes do not need as many key frames. A high motion scene may benefit from a shorter GOP as more key frames may be needed to provide a good user experience.

According to various embodiments, GOP 133 is followed by GOP 137 maintained in buffer 135 or buffer portion 135. GOP 137 includes key frame 119 followed by predictive frames 121, 123, 125, 127, 129, 131, 133, and 135. In some examples, a buffer used to maintain the sequence of frames is a first in first out (FIFO) buffer. When new frames are received, the oldest frames are removed from the buffer.

When a client 151 connects, the client receives predictive frame 105 initially, followed by predictive frames 107, 109, 111, 113, 115, and 117. Client 151 receives a total of 7 predictive frames that can not be decoded properly. In some instances, the 7 predictive frames are simply dropped by a client. Only after 7 predictive frames are received does client 151 receive a key frame 119. When a client 153 connects, the client receives predictive frame 109 initially, followed by predictive frames 111, 113, 115, and 117. Client 153 receives a total of 5 predictive frames that can not be decoded correctly. In some instances, the 5 predictive frames are simply dropped by a client. Only after 5 predictive frames are received does client 153 receive a key frame 119. When a client 155 connects, the client receives predictive frame 121 initially, followed by predictive frames 123, 125, 127, 129, 131, 133, and 135. Client 155 receives a total of 8 predictive frames that can not be decoded correctly. In some instances, the 8 predictive frames are simply dropped by a client. Only after 8 predictive frames are received does client 155 receive a key frame.

Transmitting predictive frames when a client requests a connection is inefficient and contributes to a poor user experience. Consequently, the techniques of the present invention contemplate providing a key frame initially to a client when a client requests a connection.

Figure 2:
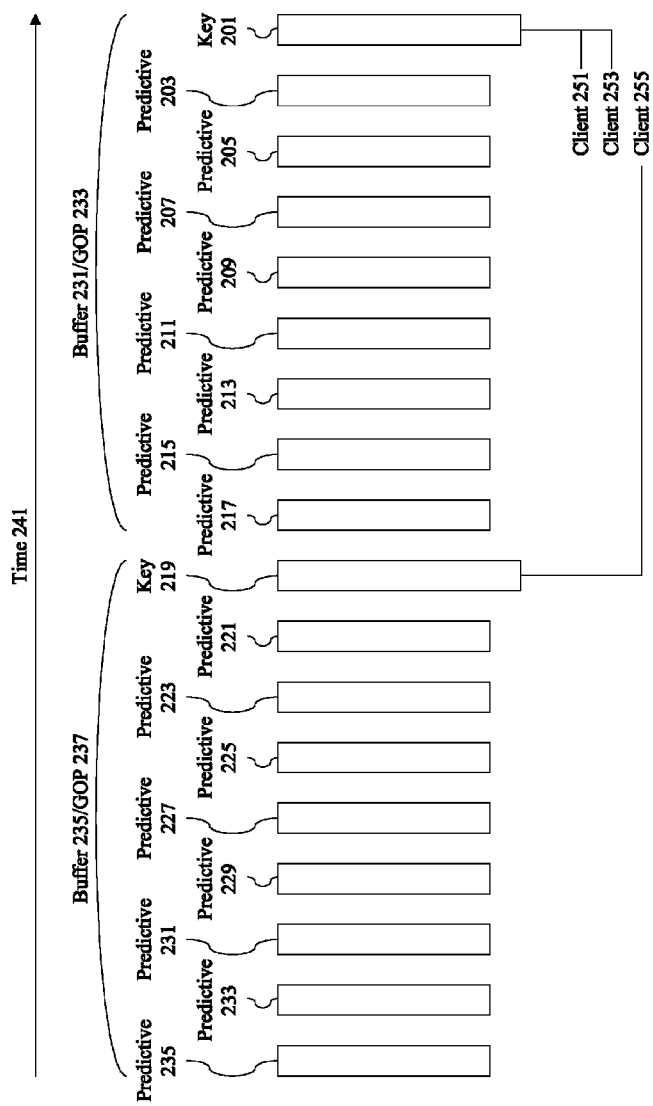
FIG. 2 is a diagrammatic representation showing another sequence of video stream frames.

FIG. 2 is a diagrammatic representation showing another example of a sequence of frames. According to various embodiments, a sequence of frames such as a sequence of video frames is received at a streaming server. In some embodiments, the sequence of video frames is associated with a particular channel and a buffer is assigned to each channel. Other sequences of video frames may be held in other buffers assigned to other channels. In other examples, buffers or portions of buffers are maintained for separate video streams and separate channels. In particular embodiments, key frame 201 is received early along time axis 241. One example of a key frame 201 is an I frame that includes substantially all of the data needed for a client device to display a frame of video. Key frame 201 is followed by predictive frames 203, 205, 207, 209, 211, 213, 215, and 217.

According to various embodiments, a sequence of different frames types, beginning with a key frame and ending just before a subsequence key frame, is referred to herein as a Group of Pictures (GOP). Key frame 201 and predictive frames 203, 205, 207, 209, 211, 213, 215, and 217 are associated with GOP 233 and maintained in buffer 231 or buffer portion 231. An encoding application typically determines the length and frame types included in a GOP. According to various embodiments, an encoder provides the sequence of frames to the streaming server. In some examples, a GOP is 15 frames long and includes an initial key frame such as an I frame followed by predictive frames such as B and P frames. A GOP may have a variety of lengths. An efficient length for a GOP is typically determined based upon characteristics of the video stream and bandwidth constrains. For example, a low motion scene can benefit from a longer GOP with more predictive frames. Low motion scenes do not need as many key frames. A high motion scene may benefit from a shorter GOP as more key frames may be needed to provide a good user experience.

According to various embodiments, GOP 233 is followed by GOP 237 maintained in buffer 235 or buffer portion 235. GOP 237 includes key frame 219 followed by predictive frames 221, 223, 225, 227, 229, 231, 233, and 235. In some examples, a buffer used to maintain the sequence of frames is a first in first out (FIFO) buffer. When newer frames are received, a corresponding number of older frames are removed from the buffer.

When a client 251 connects, the client receives no longer receives a predictive frame initially. According to various embodiments, the client 251 receives the earliest key frame available. In some instances, the earliest key frame still available in the buffer may be key frame 201. The client does not need to drop any frames or display distorted images. Instead the client 251 immediately receives a key frame that includes substantially all of the information necessary to begin playing the stream. Similarly, when client 253 requests a connection, the client receives key frame 201 initially. If key frame 201 is no longer available in the buffer, a client connecting would receive key frame 219, even if this means that predictive frames 203, 205, 207, 209, 211, 213, 215, and 217 are skipped. For example, client 255 may connect at a time that would have provided predictive frame 211, but the streaming server intelligently identifies the next available key frame as key frame 219 and provides that key frame 219 to the client 255. No predictive frames are inefficiently transmitted at the beginning of a connection request. According to various embodiments, only key frames are initially provided upon connection requests.

According to various embodiments, a streaming server performs processing on each received frame to determine which frames are key frames. Identifying key frames may involve decoding or partially decoding a frame. In other examples, key frames may be identified based upon the size of the frame, as key frames are typically much larger than predictive frames. In other examples, only a subset of frames are decoded or partially decoded. In still other examples, once a key frame is determined, the streaming server determines the GOP size N and identifies each Nth frame following a key frame as a subsequent key frame. A variety of approaches can be used to determine key frames and predictive frames. Although the techniques of the present invention contemplate efficient mechanisms for identifying key frames, the streaming server does perform some additional processing.

Furthermore, the streaming server may be providing a predictive frame, such as predictive frame 213, to an already connected client while providing a key frame 219 to a new client making a connection request. This can result in a slight but typically unnoticeable time variance in the media viewed by different clients. That is, a first client may be receiving predictive frames 213, 215, and 217 while a second client may be receiving key frame 219 and predictive frames 221 and 223. The techniques of the present invention recognize that this time shift is not disruptive of a typical user experience and a streaming server is typically capable of handling providing different frames from a stream to different client devices.

Figure 3:
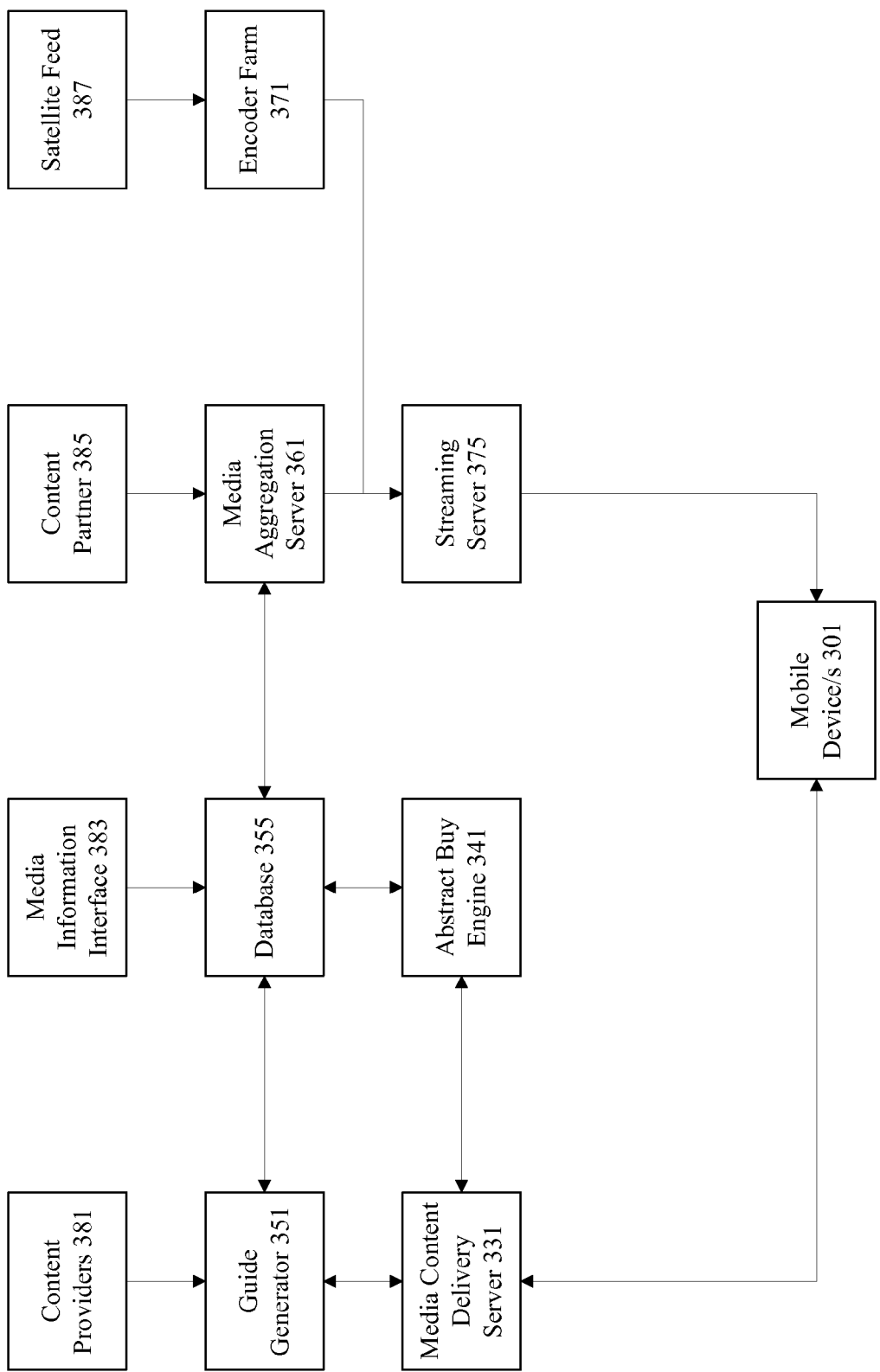
FIG. 3 is a diagrammatic representation showing one example of a network that can use the techniques of the present invention.

FIG. 3 is a diagrammatic representation showing one example of a network that can use the techniques of the present invention. Although one particular example showing particular devices is provided, it should be noted that the techniques of the present invention can be applied to a variety of streaming servers and networks. According to various embodiments, the techniques of the present invention can be used on any streaming server having a processor, memory, and the capability of identifying characteristics of frames such as frame type in media stream. According to various embodiments, a streaming server is provided with video streams from an associated encoder and handles connection requests from client devices such as computer systems, mobile phones, personal digital assistants, video receivers, and any other device having the capability of decoding a video stream.

According to various embodiments, media content is provided from a number of different sources 385. Media content may be provided from film libraries, cable companies, movie and television studios, commercial and business users, etc. and maintained at a media aggregation server 361. Any mechanism for obtaining media content from a large number of sources in order to provide the media content to mobile devices in live broadcast streams is referred to herein as a media content aggregation server. The media content aggregation server 361 may be clusters of servers located in different data centers. According to various embodiments, content provided to a media aggregation server 361 is provided in a variety of different encoding formats with numerous video and audio codecs. Media content may also be provided via satellite feed 357.

An encoder farm 371 is associated with the satellite feed 387 and can also be associated with media aggregation server 361. The encoder farm 371 can be used to process media content from satellite feed 387 as well as possibly from media aggregation server 361 into potentially numerous encoding formats. The media content may also be encoded to support a variety of data rates. The media content from media aggregation server 361 and encoder farm 371 is provided as live media to a streaming server 375. According to various embodiments, the encoder farm 371 converts video data into video streams such as MPEG video streams with key frames and predictive frames.

Possible client devices 301 include personal digital assistants (PDAs), cellular phones, personal computing devices, computer systems, television receivers, etc. According to particular embodiments, the client devices are connected to a cellular network run by a cellular service provider. Cell towers typically provide service in different areas. Alternatively, the client device can be connected to a wireless local area network (WLAN) or some other wireless network. Live media streams provided over RTSP are carried and/or encapsulated on any one of a variety of networks.

In particular embodiments, some client devices are also connected over a wireless network to a media content delivery server 331. The media content delivery server 331 is configured to allow a client device 301 to perform functions associated with accessing live media streams. For example, the media content delivery server allows a user to create an account, perform session identifier assignment, subscribe to various channels, log on, access program guide information, and obtain information about media content, etc. According to various embodiments, the media content delivery server does not deliver the actual media stream, but merely provides mechanisms for performing operations associated with accessing media.

In other implementations, it is possible that the media content delivery server also provides media clips, files, and streams. The media content delivery server is associated with a guide generator 351. The guide generator 351 obtains information from disparate sources including content providers 381 and media information sources 383. The guide generator 351 provides program guides to database 355 as well as to media content delivery server 331 to provide to mobile devices 301. The media content delivery server 331 is also associated with an abstract buy engine 341. The abstract buy engine 341 maintains subscription information associated with various client devices 301. For example, the abstract buy engine 341 tracks purchases of premium packages.

Although the various devices such as the guide generator 351, database 355, media aggregation server 361, etc. are shown as separate entities, it should be appreciated that various devices may be incorporated onto a single server. Alternatively, each device may be embodied in multiple servers or clusters of servers. According to various embodiments, the guide generator 351, database 355, media aggregation server 361, encoder farm 371, media content delivery server 331, abstract buy engine 341, and streaming server 375 are included in an entity referred to herein as a media content delivery system.

Figure 4:
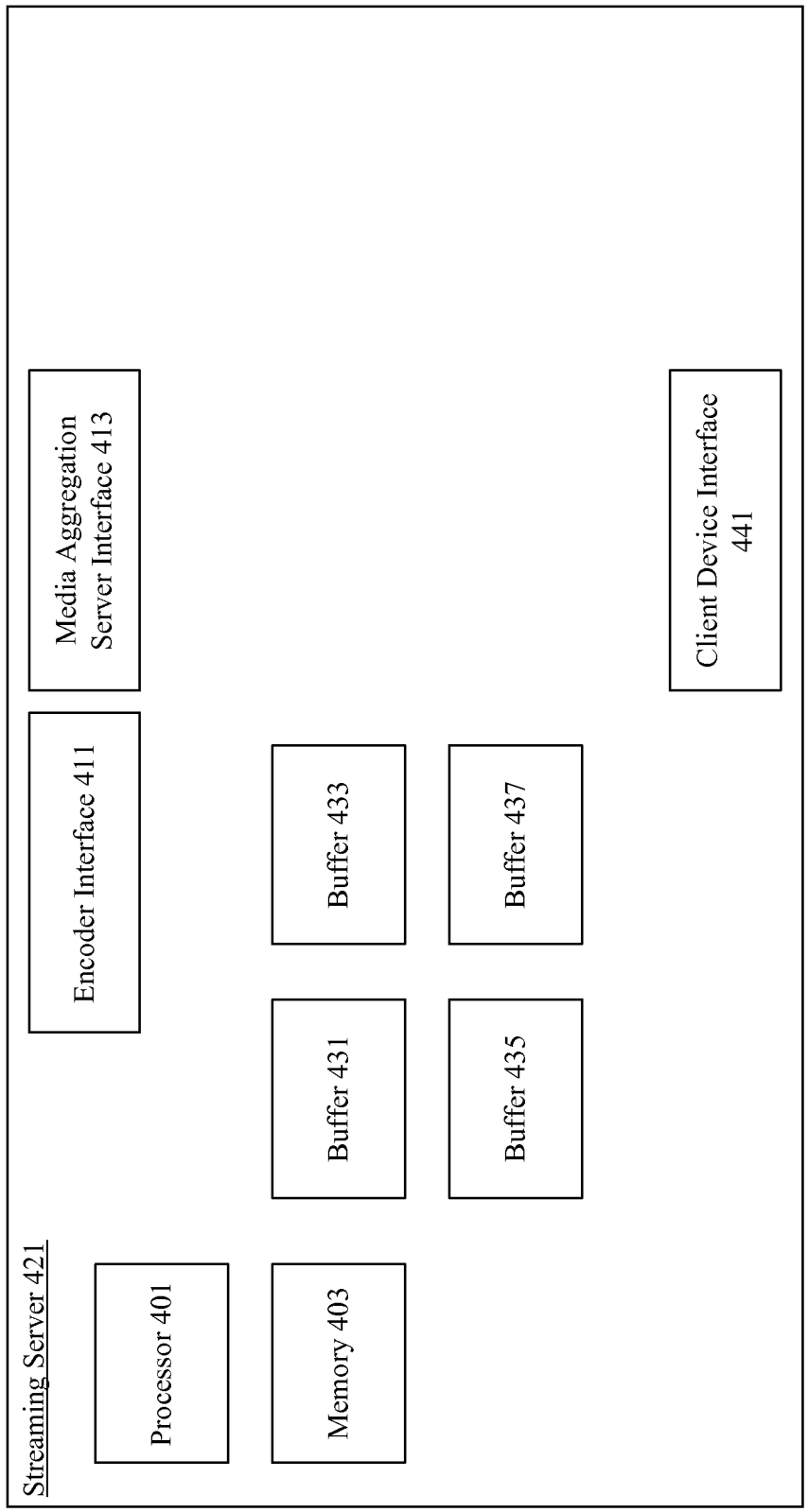
FIG. 4 is a diagrammatic representation showing one example of a streaming server.

FIG. 4 is a diagrammatic representation showing one example of a streaming server 421. According to various embodiments, the streaming server 421 includes a processor 401, memory 403, buffers 431, 433, 435, and 437, and a number of interfaces. In some examples, the interfaces include an encoder interface 411, a media aggregation server interface 413, and a client device interface 441. The encoder interface 411 and the media aggregation server interface 413 are operable to receive media streams such as video streams. In some examples, hundreds of video streams associated with hundreds of channels are continuously being received and maintained in buffers 431, 433, 435, and 437 before being provided to client devices through client device interface 441.

According to various embodiments, the streaming server 421 handles numerous connection requests from various client devices. Connection requests can result from a variety of user actions such as a channel change, an application launch, a program purchase, etc. In some instances, a streaming server 421 simply provides the first available frame followed by subsequent frames in response to a client device connection request. However, the techniques of the present invention contemplate an intelligent streaming server that identifies key frames in video streams and provides a key frame initially to a client device. The key frame includes substantially all the information needed for a client device to begin display a correct video frame.

According to various embodiments, buffers 431, 433, 435, and 437 are provided on a per channel basis. In other examples, buffers are provided on a per GOP basis. Although buffers 431, 433, 435, and 437 are shown as discrete entities, it should be recognized that buffers 431, 433, 435, and 437 may be individual physical buffers, portions of buffers, or combinations of multiple physical buffers. In some examples, virtual buffers are used and portions of a memory space are assigned to particular channels based on need.

Although a particular streaming server 421 is described, it should be recognized that a variety of alternative configurations are possible. For example, some modules such as a media aggregation server interface may not be needed on every server. Alternatively, the multiple client device interfaces for different types of client devices may be included. A variety of configurations are possible.

Figure 5:
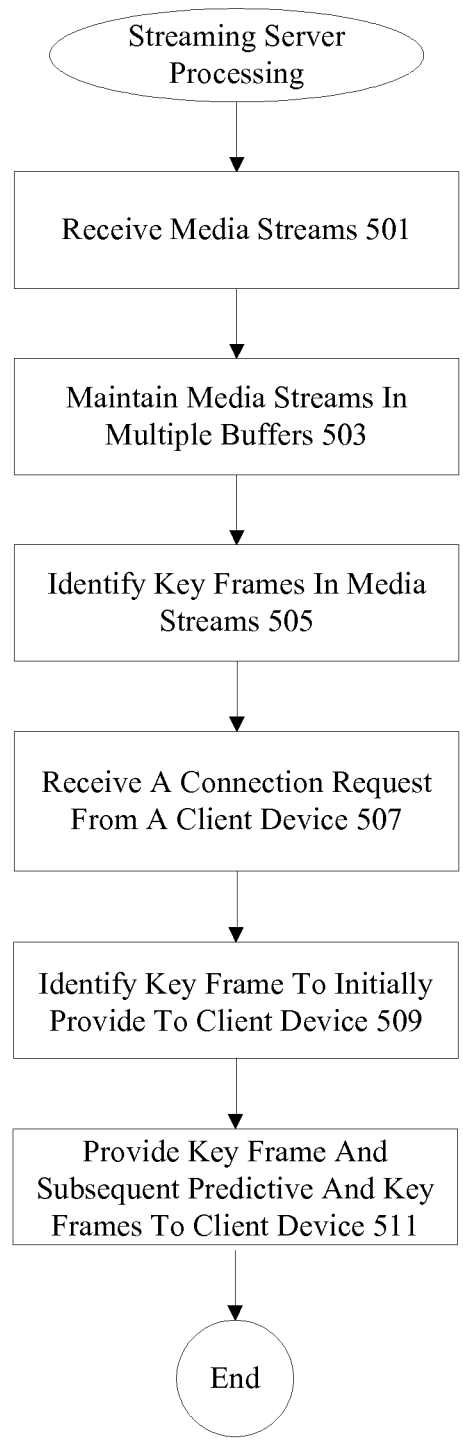
FIG. 5 is a flow process diagram showing processing at a streaming server.

FIG. 5 is a flow process diagram showing one example of streaming server processing. At 501, media streams are received. According to various embodiments, media streams are continuously being received at a streaming server. At 503, media streams are maintained in multiple buffers. At 505, key frames in media streams are identified. In some examples, identifying key frames may involve determining the video codec, the GOP size, and/or the frame size and performing decoding or partial decoding of frames. A streaming server may be able to determine key frames by identifying the start of a GOP and the GOP size and flagging each start of a GOP as a key frame. A streaming server may also identify larger frames as key frames.

Partial decoding or full decoding can also be used. At 507, a connection request from a client device is received. At 509, a key frame to initially provide to the client device is identified. In some examples, the key frame identified is the earliest key frame for the requested channel available in a buffer for the channel. At 511, the key frame and subsequent predictive and key frames are sent to the client device 511.

Figure 6:
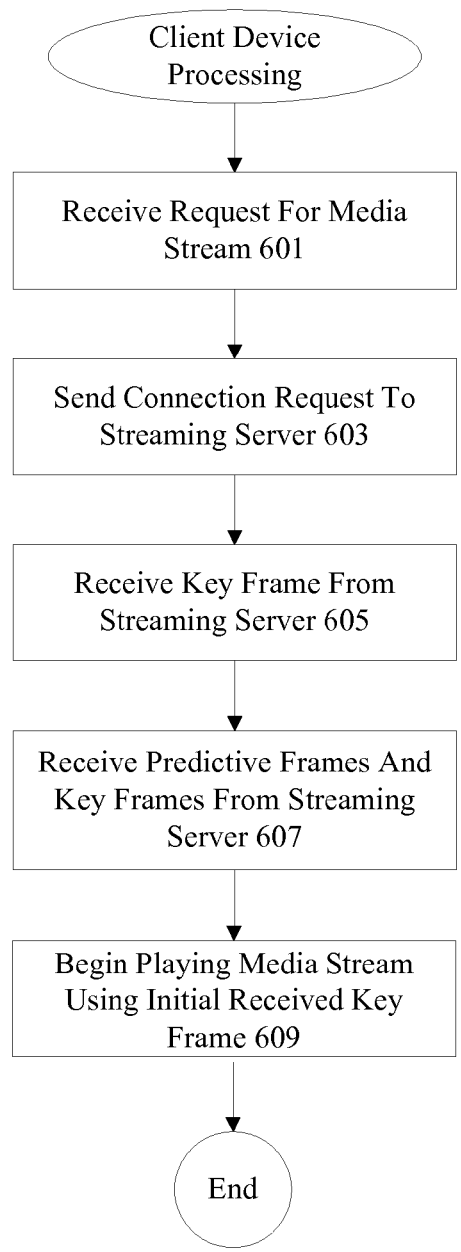
FIG. 6 is a flow process diagram showing processing at a client device.

FIG. 6 is a flow process diagram showing one example of client device processing. In some examples, a client device is a mobile device. However, it should be noted that a client device can be any device associated with a decoder that is capable of displaying a video frame. That is a client device can be any computer system, portable computing device, gaming device, mobile phone, receiver, etc. At 601, a request is received for a media stream. According to various embodiments, the request on the client device may be the result of a user action. At 603, the client device sends a connection request to the streaming server. According to various embodiments, the connection request identifies a particular program or channel. At 605, a key frame is received from the streaming server. According to various embodiments, the client device receives the key frame first before any other frames. At 607, subsequent predictive frames and key frames are received from the streaming server. At 609, the client device plays the media stream using the initial received key frame. In some examples, the client device includes a decoder that processes the video stream received from the streaming server. In other examples, a decoding device may reside between the client device and the streaming server, and the client device simply plays video data.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method, comprising:
receiving a first media stream including a first plurality of frames, the first media stream received at a streaming server and maintained in a first buffer, wherein a plurality of buffers at the streaming server are allocated on a per group of pictures (GOP) basis;
receiving a second media stream including a second plurality of frames, the second media stream received at the streaming server and maintained in a second buffer;
determining positions of a plurality of key frames in the first buffer and the second buffer, the plurality of key frames including a first key frame in the first buffer and a second key frame in the second buffer, wherein determining positions of the plurality of key frames includes determining at the streaming server each start of a GOP in a plurality of GOPs, wherein each start of a GOP is flagged as a key frame;
receiving a channel change request from a client device receiving the first media stream, the channel change request corresponding to a switch from the first media stream to the second media stream;
identifying a next available key frame associated with the second media stream, wherein the next available key frame is provided as the second key frame in response to the channel change request, wherein no predictive frames are transmitted at the beginning of the channel change request; and
immediately sending the second key frame to the client device in response to receiving the channel change request, wherein sending the second key frame results in a time variance between receiving the second media stream on the client device and receiving the second media stream on a different client device.

2. The method of claim 1, wherein the first media stream is a first video stream and the second media stream is a second video stream.

3. The method of claim 1, wherein key frames are identified by detecting frames larger than a particular size.

4. The method of claim 1, wherein the plurality of GOPs are fixed in length.

5. The method of claim 1, wherein the plurality of GOPs are variable in length.

6. The method of claim 1, wherein each key frame of said plurality of key frames is an I-frame.

7. The method of claim 1, wherein channel change does not occur until the second key frame can be provided to the client device.

8. A system, comprising:
an interface configured to receive a first media stream including a first plurality of frames and a second media stream including a second plurality of frames, the first media stream received at a streaming server and maintained in a first buffer and the second media stream received at the streaming server and maintained in a second buffer, wherein a plurality of buffers at the streaming server are allocated on a per group of pictures (GOP) basis;
a processor configured to determine positions of a plurality of key frames in the first buffer and the second buffer, the plurality of key frames including a first key frame in the first buffer and a second key frame in the second buffer, wherein determining positions of the plurality of key frames includes determining at the streaming server each start of a GOP in a plurality of GOPs, wherein each start of a GOP is flagged as a key frame;
wherein the processor is further configured to identify a next available key frame associated with the second media stream, wherein the next available key frame is provided as the second key frame in response to the channel change request, wherein no predictive frames are transmitted at the beginning of the channel change request; and
wherein the processor is further configured to immediately send the second key frame to the client device in response to receiving the channel change request, wherein sending the second key frame results in a time variance between receiving the second media stream on the client device and receiving the second media stream on a different client device.

9. The method of claim 8, wherein the first media stream is a first video stream and the second media stream is a second video stream.

10. The method of claim 8, wherein key frames are identified by detecting frames larger than a particular size.

11. The method of claim 8, wherein the plurality of GOPs are fixed in length.

12. The method of claim 8, wherein the plurality of GOPs are variable in length.

13. The method of claim 8, wherein each key frame of said plurality of key frames is an I-frame.

14. The method of claim 8, wherein channel change does not occur until the second key frame can be provided to the client device.

15. A non-transitory computer readable medium, comprising:
computer code for receiving a first media stream including a first plurality of frames, the first media stream received at a streaming server and maintained in a first buffer, wherein a plurality of buffers at the streaming server are allocated on a per group of pictures (GOP) basis;
computer code for receiving a second media stream including a second plurality of frames, the second media stream received at the streaming server and maintained in a second buffer;
computer code for determining positions of a plurality of key frames in the first buffer and the second buffer, the plurality of key frames including a first key frame in the first buffer and a second key frame in the second buffer, wherein determining positions of the plurality of key frames includes determining at the streaming server each start of a GOP in a plurality of GOPS, wherein each start of a GOP is flagged as a key frame;

computer code for receiving a channel change request from a client device receiving the first media stream, the channel change request corresponding to a switch from the first media stream to the second media stream;

computer code for identifying a next available key frame associated with the second media stream, wherein the next available key frame is provided as the second key frame in response to the channel change request, wherein no predictive frames are transmitted at the beginning of the channel change request; and computer code for immediately sending the second key frame to the client device in response to receiving the channel change request, wherein sending the second key frame results in a time variance between receiving the second media stream on the client device and receiving the second media stream on a different client device.

16. The computer readable medium of claim 15, wherein the first media stream is a first video stream and the second media stream is a second video stream.

17. The computer readable medium of claim 15, wherein key frames are identified by detecting frames larger than a particular size.

18. The method of claim 15, wherein the plurality of GOPs are fixed in length.

19. The method of claim 15, wherein the plurality of GOPs are variable in length.

20. The computer readable medium of claim 15, wherein each key frame of said plurality of key frames is an I-frame.

* * * * *